J. W. FERREE.
COMBINED FISH HOOK AND TRAP.
APPLICATION FILED FEB. 6, 1915.
1,172,780.
Patented Feb. 22, 1916.
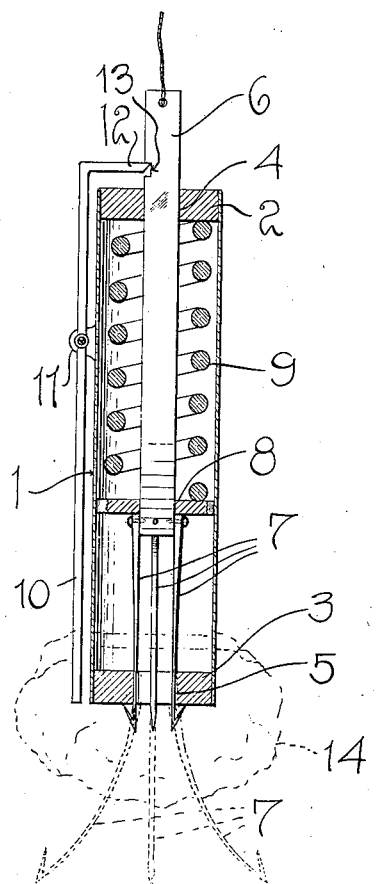
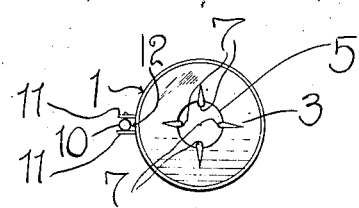
Inventor
J. W. FERREE
By Watson E. Coleman
Attorney
Witnesses
Robert M. Sutphen
A. D. Hinf

UNITED STATES PATENT OFFICE.

JOHN W. FERREE, OF KANSAS CITY, MISSOURI.

COMBINED FISH-HOOK AND TRAP.

1,172,780.  Specification of Letters Patent.  Patented Feb. 22, 1916.

Application filed February 6, 1915. Serial No. 6,523.

*To all whom it may concern:*

Be it known that I, JOHN W. FERREE, a citizen of the United States, residing at Kansas City, in the county of Jackson and State of Missouri, have invented certain new and useful Improvements in Combined Fish-Hooks and Traps, of which the following is a specification, reference being had to the accompanying drawings.

This invention relates to new and useful improvements in combined fish hooks and animal traps, the main object of the present invention being the provision of a combined fish hook and animal trap which consists of spring actuated impaling prongs, carried within a casing and adapted to be actuated by the fish or animal to be trapped.

Another object of the present invention is the provision of a fish hook and animal trap of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claim.

In the accompanying drawing forming a part of this application, Figure 1 is a longitudinal sectional view of a combined fish hook and trap constructed in accordance with my invention; and Fig. 2 is an end elevation illustrating the impaling members in their operative positions; Fig. 3 is a detail view of one of the impaling members.

In carrying out my invention, I provide a cylindrical casing which is generally indicated by the numeral 1, said casing being formed of suitable size tubing and each end thereof provided with a closure plug, said plugs being provided with a centrally arranged opening, the plug 2 being provided with a rectangular opening 4, while the plug 3 is provided with a circular opening 5. Movable through the opening 4 is a substantially rectangular rod 6, to the inner end of which is riveted a plurality of impaling members 7 which are adapted to be movably disposed within the opening 5 and normally arranged within the tubing 1. The inner end of the rod 6 is provided with a bearing plate 8 which is of substantially the same size as the interior of the tubing 1 and mounted upon the rod 6 and disposed between the plug 2 and the bearing plate 8, in a coil spring 9 which is adapted to be placed under tension and the tension of said spring being adapted to force the impaling members 7 out through the opening 5. It will be noted that these impaling members are resilient and when in protracted position are slightly curved and the points thereof diverge in various directions, so that when they are forced out through the opening 5 and engaged within the fish or animal's mouth, it will almost be impossible for the fish or animal to release itself.

In order to retain the rod 6 in an operative position within the tube 1, I provide the pivoted bar 10 which is mounted between the spaced ears 11 formed upon one side of the tube 1 and the inner end thereof is provided with an angular arm 12, the end of which engages within the recess 13 formed in the rod 6, to retain the rod in its set position. As disclosed in Fig. 1, the rod 6 is arranged in an operative position, the spring 9 being placed under tension so that when the arm 10 is disengaged from the recess 13, the tension of the spring bearing against the plate 8 will force the impaling members 7 out through the opening 5 in divergent directions, so as to engage within the mouth of the fish or animal and prevent the same from becoming released. It will be noted that the outer end of the bar 10 is arranged in spaced relation with the outer end of the tubing 1 and arranged over the end of the bar and the tubing, is the bait, generally indicated by the numeral 14 and which will be of any desirable material according to the animal to be trapped.

It will be noted that by having the impaling members 7 formed substantially in a curve, as shown in Fig. 3, these members will be placed under tension when drawn into the casing tube, as shown in Fig. 1, whereby the tension of the impaling members will force them outwardly with considerably greater force when released from the tubing, than if they were formed straight. From this it will be apparent that when the fish or animal attempts to remove the bait, it will actuate the bar 10 through the engagement of the bait with the bar, so as to remove the end of the arm 12 from the recess 13 and thus release the rod, so that the tension of the spring 9 will force the impaling members 7 out through the opening 5 and engaged within the mouth of the fish or animal. From this it will be apparent that I have provided a simple and durable fish hook and animal trap which can be readily set for use and easily actuated by the fish or animal attempting to remove the bait.

It will be noted that the outer end of the rod 6 is provided with a transverse opening 15, to which the line is attached, so that when the animal becomes impaled upon the prongs, it will be almost impossible for the fish or animal to become disengaged therefrom as the prongs diverge and engage within the mouth of the fish or animal at various points, retaining the mouth in an open position. My improved fish hook and trap, as herein shown and described, is extremely simple in construction, and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claim.

Having thus described this invention, what I desire to claim as new and secure by Letters Patent, is:—

A device of the character described including a casing having an end closed, said end being provided with an opening, a rod mounted for reciprocation within the casing resilient impaling members connected to the rod and projecting through the opening in the end of the casing, said impaling members being normally curved and arranged to diverge when extended exteriorly of the casing, and automatic means for imparting movement to the rod in one direction to force the impaling members exterior of the casing.

In testimony whereof I hereunto affix my signature in the presence of two witnesses.

JOHN W. FERREE.

Witnesses:
P. L. KERR,
F. R. WHITE.